No. 659,561. Patented Oct. 9, 1900.
W. C. WALLACE.
APPARATUS FOR HEATING AIR TO BE SUPPLIED TO FURNACES.
(Application filed June 28, 1900.)
(No Model.) 3 Sheets—Sheet 1.

WITNESSES
INVENTOR
William Carlile Wallace
BY Hawson & Hawson
ATTORNEYS

No. 659,561. Patented Oct. 9, 1900.
W. C. WALLACE.
APPARATUS FOR HEATING AIR TO BE SUPPLIED TO FURNACES.
(Application filed June 28, 1900.)
(No Model.) 3 Sheets—Sheet 3.

WITNESSES
INVENTOR
William Carlile Wallace
BY
ATTORNEYS

UNITED STATES PATENT OFFICE.

WILLIAM CARLILE WALLACE, OF SHEFFIELD, ENGLAND, ASSIGNOR OF ONE-HALF TO THE JOHN BROWN & COMPANY, LIMITED, OF SAME PLACE.

APPARATUS FOR HEATING AIR TO BE SUPPLIED TO FURNACES.

SPECIFICATION forming part of Letters Patent No. 659,561, dated October 9, 1900.

Application filed June 28, 1900. Serial No. 21,980. (No model.)

*To all whom it may concern:*

Be it known that I, WILLIAM CARLILE WALLACE, a subject of the Queen of Great Britain and Ireland, and a resident of Atlas Works, Sheffield, in the county of York, England, have invented certain new and useful Improvements in Apparatus for Heating Air to be Supplied to Furnaces, (for which application has been made for a patent in Great Britain, No. 8,723, dated May 11, 1900,) which invention is fully set forth in the following specification.

This invention has for its object to provide apparatus in connection with furnaces whereby air is heated for supply to the furnaces in a more efficient manner than hitherto.

In the accompanying drawings a portion of a boiler and furnace is shown sufficient to illustrate the application of this invention thereto.

Figure 1:
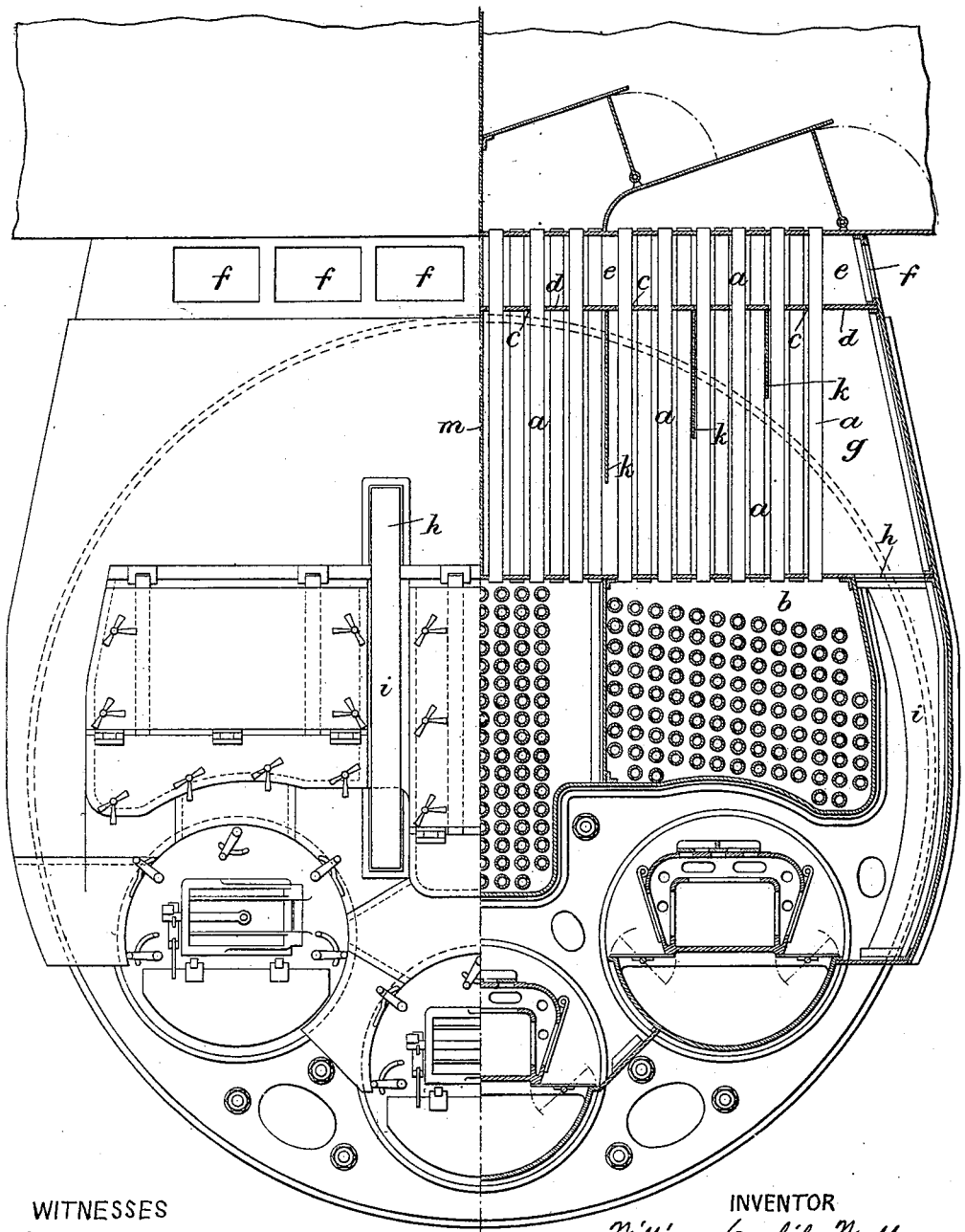
Figure 2:
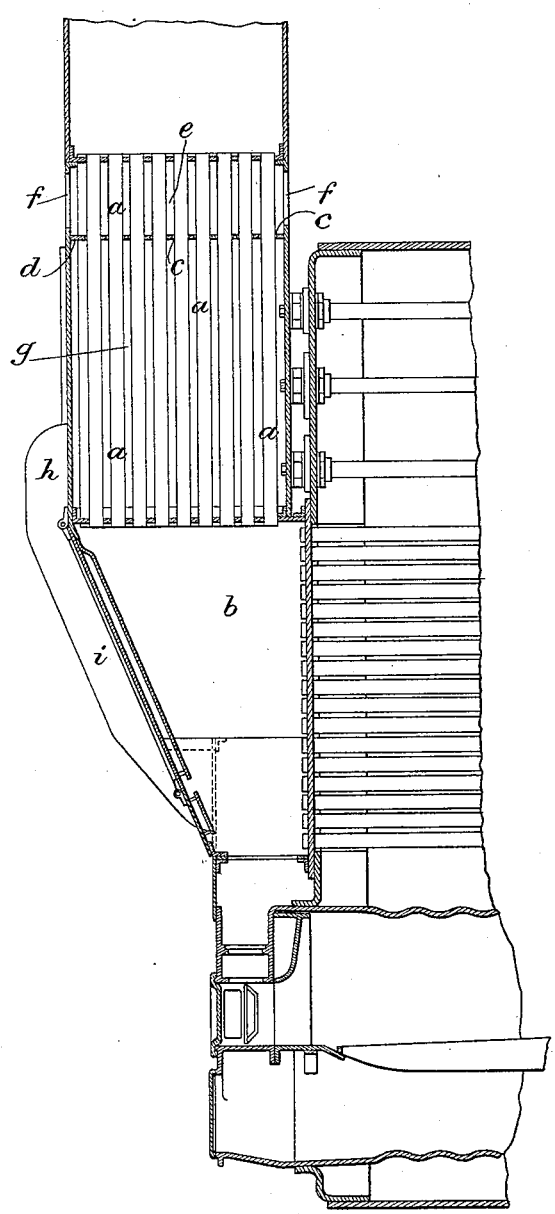
Figure 3:
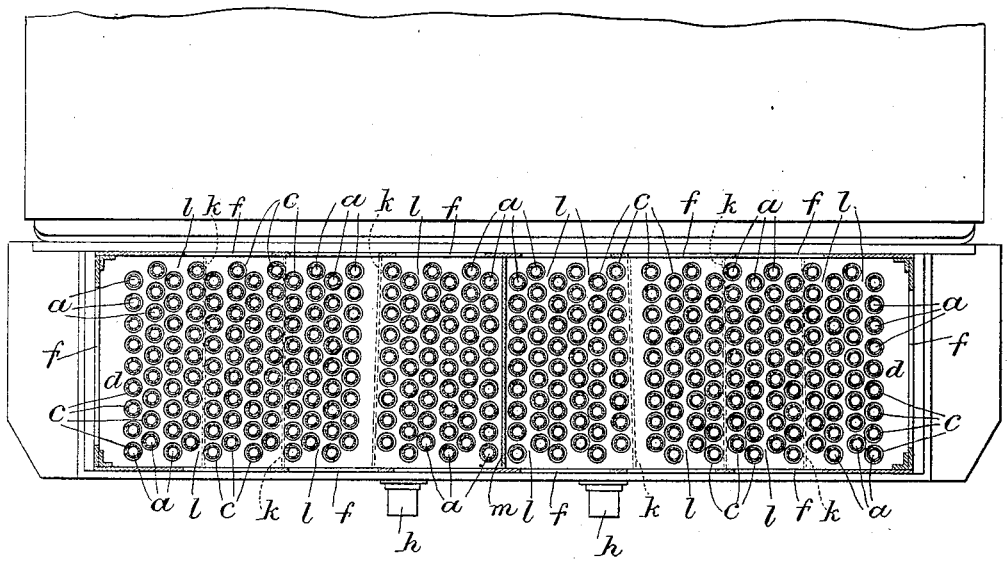

Figure 1 is a half-front elevation and half-transverse section. Fig. 2 is a longitudinal section, and Fig. 3 is a horizontal section.

The heating of the air is effected by causing it on its way to the furnace to come into contact with tubes $a$, through which pass the heated products from the furnace, the said products entering the tubes from the space $b$ below. The said tubes $a$ pass through perforations $c$ in a plate $d$, which perforations are of such a size as to leave a small and preferably annular space around each of the tubes. The said plate constitutes a division between an upper air-space $e$, into which the air to be heated enters by openings at $f$, and a lower air-chamber $g$, into which the air passes from the upper air-space through the perforations $c$ in the said plate $d$ and in close contact with the said tubes $a$, the said air thence passing by the outlet $h$ into the passage $i$, leading into the furnace.

In order to cause the air to come into efficient contact with the tubes $a$ in the lower air-chamber $g$ and prevent the said air passing directly across the tubes to the outlet $h$ and air-passage $i$, leading to the furnace, depending plates $k$ are, according to this invention, used, extending down from the perforated plate $d$, the said depending plates $k$ being preferably longer—that is, they extend nearer to the bottom of the said space—as they approach the center. The said depending plates $k$ conduct the air downward and cause the said air to come into efficient contact with the said tubes $a$. The said tubes $a$ are preferably arranged so that the spaces between the several transverse rows thereof are wider alternately at opposite sides, as shown in the plan at $l$, so as to allow the air entering sidewise to find ready access to between the tubes $a$ in the upper air-space.

The arrangement illustrated is provided with a double arrangement of air-spaces for supplying heated air to three furnaces, the division-plate $m$ dividing the air-spaces; but it will be understood that a single arrangement or more than two arrangements, as described, in combination, can be used, if desired.

Having now particularly described and ascertained the nature of my said invention and in what manner the same is to be performed, I declare that what I claim is—

1. In apparatus for heating air to be supplied to furnaces the combination with tubes through which the heated products from the furnace pass of an air-chamber the upper plate of which is provided with perforations through which the tubes pass the said perforations being of such a size as to leave spaces between the tubes and perforations for the inlet of air to the said air-chamber, an outlet from the said air-chamber to a passage leading to the furnace and depending plates extending down from the perforated plate between the tubes so arranged as to conduct the air downward and cause it to come into efficient contact with the tubes substantially as hereinbefore described.

2. In apparatus for heating air to be supplied to furnaces the combination with tubes through which the heated products from the furnace pass of an air-chamber the upper plate of which is provided with perforations through which the tubes pass the said perforations being of such a size as to leave spaces for the inlet of air to the said air-chamber and the tubes and perforations being arranged so that the spaces between the several transverse rows thereof are wider alternately at opposite sides, an outlet from the said air-chamber to a passage leading to the furnace and depending plates extending down from the perforated plate between the tubes so arranged as to conduct the air downward and cause it to come into efficient contact with the tubes all substantially as hereinbefore described.

In testimony whereof I have signed this specification in the presence of two subscribing witnesses.

WILLIAM CARLILE WALLACE.

Witnesses:
FRANK E. BECHTOLD,
JOS. H. KLEIN.